Jan. 11, 1938.                G. A. PETROE                2,105,127
                              FLUID METER
                          Filed Feb. 5, 1936         2 Sheets-Sheet 1

INVENTOR
Gregory A. Petroe
BY
Pennie, Davis, Marvin & Edmonds
ATTORNEYS

Jan. 11, 1938.    G. A. PETROE    2,105,127
FLUID METER
Filed Feb. 5, 1936    2 Sheets-Sheet 2
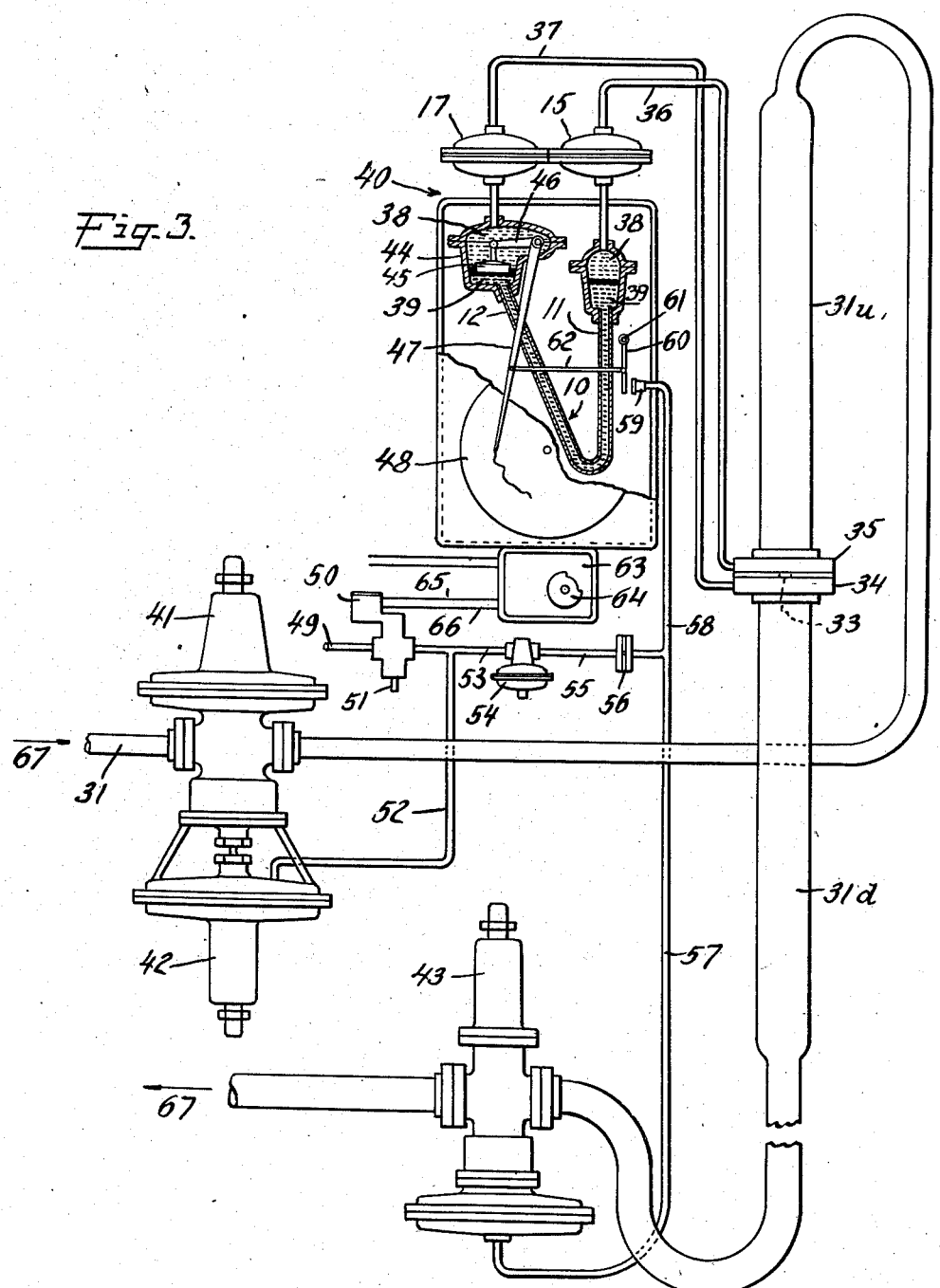
INVENTOR
Gregory A. Petroe
BY
ATTORNEYS Patented Jan. 11, 1938

2,105,127

UNITED STATES PATENT OFFICE 2,105,127

FLUID METER

Gregory A. Petroe, Niagara Falls, N. Y., assignor to The Mathieson Alkali Works, Inc., New York, N. Y., a corporation of Virginia Application February 5, 1936, Serial No. 62,487

2 Claims. (Cl. 73—205)

This invention relates to the measurement of the rate of flow or volume of a fluid, and has for its object certain improvements in apparatus for effecting such measurement.

The rate of flow of fluids (gases, vapors and liquids) as determined by orifices, Venturi meters, flow meters, etc., depends on a difference in head expressed in feet of the fluid flowing. This difference in head, commonly called differential head, is usually measured as the difference of two pressures, or pressure drop, obtained by the use of a differential gauge or manometer, such as a vertically placed U-shaped tube, partially filled with a suitable liquid (or two liquids immiscible with one another and) immiscible with the fluid flowing and of higher specific gravity. The difference in head expressed in feet of liquid under measurement may be determined by the following formula:

$$\frac{V_2^2}{2g} - \frac{V_1^2}{2g} = \frac{P_1 - P_2}{d} = h$$

in which $h$=the differential head expressed in feet of the liquid under measurement
$V_1$=the velocity at the up-stream side of the orifice
$V_2$=the velocity at the down-stream side of the orifice
$P_1$=pressure at the up-stream side of the orifice
$P_2$=pressure at the down-stream side of the orifice
$d$=density of the liquid under measurement A common method of determining the rate of flow of gases, vapors and liquids through a pipe is to measure the pressure drop caused by the insertion of a sharply restricted opening or orifice of known size into the pipe. This may be accomplished by using a manometer, such as the U-tube type, one arm of which connects with the pipe in the up-stream side of the orifice, and the other arm of which connects with the pipe in the down-stream side of the orifice. As the rate of fluid flow increases, the differential increases. As the differential increases, the meniscus (surface) of the high specific gravity liquid in the up-stream arm of the manometer falls, and its meniscus in the down-stream arm rises. The difference between the elevations of the two meniscuses is the differential.

A familiar practice with the manometer type gauge is to utilize the difference in head to record the rate of fluid flow through the pipe and to maintain the rate of the fluid flow at a predetermined value by controlling automatically the difference in head produced by the rate of flow of the liquid through the restricted orifice, or even to decrease or increase the rate of fluid flow to a different desired value. In the latter case, however, the rate of fluid flow cannot be increased beyond that permitted by the pressure in the up-stream side of the restricted orifice. As the level of the high specific gravity liquid in the manometer rises in the down-stream arm of the manometer, it raises a float in a recorder and controller device, which is connected to and therefore also moves a differential pen shaft. The pen shaft movement is proportionate to the rise of the float, or to the difference in pressure between the opposite sides of the restricted orifice. The movement of the shaft is then suitably employed to cause a proportionate movement of a control valve which thus automatically regulates the amount of fluid flowing through the pipe.

It is customary to connect the up-stream side of the restricted orifice in the pipe with the up-stream arm of the manometer, and the down-stream side of the orifice with the down-stream arm of the manometer, usually by means of a small diameter copper tubing. The manometer and pipe are thereby placed in open communication with one another, and the differential pressure may be readily noted. Mercury is frequently used as the high specific gravity liquid in the manometer. This means that some of the fluid that is to be and is passed through the restricted orifice comes in contact with the mercury, or other high gravity liquid, employed in the manometer. In many cases this contact is not objectionable, because no reaction takes place between the manometer liquid and the flowing fluid to be measured and regulated. In some cases, however, such contact is highly objectionable, as in the case of chlorine gas, acids and the like. Chlorine gas is highly reactive and combines with mercury, for example, to form a chloride of mercury. The mercury may in time be in part or whole converted to a salt, which would detrimentally affect the accuracy of the manometer. The tubes might become clogged with the salt and numerous other difficulties would be encountered in the recorder and controller device. It is standard practice in some applications to install sealing liquid of water or oil over the mercury in order to prevent contamination of the mercury. The same objection, however, is advanced to the use of a sealing liquid as we know of no sealing liquid which can be used and will not be affected by contact with the chlorine gas forming waxy or corrosive compounds, which would impair the operation of the meter.

As a result of my investigations I have discovered improvements in apparatus which overcome the difficulties just enumerated, and, according to my invention, advantage is taken of the principles of the manometer, but the flowing fluid, the rate and volume of which are to be measured, does not come in contact with the liquid or liquids employed in the manometer. The manometer itself and its associated devices may be operated in substantially the same manner, but in combination with my improvements.

According to the present invention, a secondary device is employed in conjunction with the usual manometer. This device consists generally of a pair of diaphragm housings, each of which is divided into two non-communicating chambers by means of a thin diaphragm, for example, silver or any other corrosion resistant material suitable for the work. A diaphragm chamber of each housing connects with a separate arm of a manometer. The other chambers of the two housings connect with opposite sides, respectively, of an orifice structure.

The manometer and secondary device just described may also advantageously be employed in conjunction with a suitable device for recording purposes. In this manner, the rate of flow, or a measure thereof, of fluid flowing through a restricted orifice may be measured and recorded.

These and other features of the invention will be better understood if reference is made to the accompanying drawings, taken in conjunction with the following description, in which Fig. 1 is an elevation partly in section of a manometer and a secondary device connected to a pipe, illustrative of a practice of the invention;

Fig. 2 is a cross-section of a modified form of diaphragm housing; and

Fig. 3 is an elevation of a manometer and secondary device hook-up in conjunction with a recorder and controller mechanism, also illustrative of a practice of the invention.

Referring to Fig. 1, a manometer 10, of the conventional U-shaped type, is shown provided with an up-stream arm 11 and a down-stream arm 12, and a purge connection 13 at the bottom thereof. An orifice meter scale 14 is suitably positioned directly behind the manometer arms. The up-stream arm communicates with an up-stream diaphragm housing 15 by means of a conduit 16. The down-stream arm communicates with a down-stream diaphragm housing 17 by means of a conduit 18. A valved conduit 19 communicates with conduits 16 and 18 and thus places the tops of the manometer arms in intercommunication with one another, if desired.

The up-stream diaphragm housing 15 is subdivided into two non-communicating chambers 20 and 21 by means of a thin diaphragm 22. The lower diaphragm chamber 20 communicates with the up-stream manometer arm 11 by means of conduit 16. The down-stream housing 17 is similarly subdivided into a lower diaphragm chamber 23 and an upper diaphragm chamber 24 by means of a thin diaphragm 25. The lower diaphragm chamber 23 communicates with the down-stream manometer arm 12 by means of conduit 18. Each diaphragm housing advantageously consists of a lower shell 26 and an upper shell 27 provided with flanges 28 and 29, respectively. The rim of the diaphragm is placed between the flanges, after which the flanges may be drawn tightly toward one another by means of bolts, screws, or the like.

Fig. 2 shows a modified form of housing construction, in which the thin diaphragm 30 is of the bellows type. The diaphragms are advantageously constructed of thin silver, or other suitable metal, or metal alloy.

Again referring to Fig. 1, a pipe 31 is shown for the passage of fluid therethrough. The pipe is provided with a thin disc 32 having a small or restricted orifice 33. The disc is held in place by flanges 34 and 35. A tube 36 connects the up-stream side of the restricted orifice, through the flange 35, with the upper diaphragm chamber 21 in the up-stream diaphragm housing 15. A similar tube 37 connects the down-stream side of the restricted orifice, through flange 34, to the upper diaphragm chamber 24 of the down-stream diaphragm housing 17.

The manometer arms, their connecting conduits 16 and 18, and communicating diaphragm chambers 20 and 23 are completely filled with two immiscible liquids 38 and 39 of different specific gravities with sufficient color differences, so that a reading is possible at the meniscus of the heavier liquid 39. The heavier liquid of course settles at the bottom of the manometer, while the lighter liquid fills the remainder of the manometer arms, their connecting conduits and the lower diaphragm chambers. The thin diaphragms 22 and 25 are in this manner supported upon a hydraulic cushion. The two immiscible different specific gravity manometer liquids may for example consist of such combinations as (1) mercury and water, (2) oil and water, (3) dyed carbon tetrachloride and water, etc. When it is desired, however, to operate a standard form of meter which depends for its operation upon the ability of the manometer liquid to raise or lower a float, it is necessary to use a liquid, such as mercury, with sufficient density to impart buoyancy to the float.

Referring to Fig. 3, the apparatus just described, in essential details at least, is shown employed in conjunction with a recorder and controller instrument 40. The up-stream side of the pipe 31 is shown provided with a shut-off valve 41. This valve is advantageously of the motor operated type, and as shown consists of a pressure regulating valve in combination with a diaphragm shut-off motor 42. A pressure reducing valve in combination with a spring motor (for example, as disclosed in my Patent 2,026,704) may also be employed. The down-stream side of the pipe 31 is provided with a diaphragm control valve 43 which may be of the same type as that shown in the patent just referred to.

The manometer 10 is in this modification provided with a heavy liquid chamber 44 in the down-stream arm 12. This chamber is in turn provided with a float 45 connected by appropriate linkage 46 to a differential pen shaft 47. The movement of the differential pen shaft is proportionate to the rise or to the difference in pressure between the down-stream and up-stream sides of the restricted orifice, and appropriate record of such movements is made by the pen on chart 48.

A compressed air (or gas) control supply line 49 connects with a 3-way solenoid operated valve 50 provided with an air vent 51. This valve opens so as to admit a fluid pressure to the discharge of the valve. The high pressure side of the air discharge is carried by means of tube 52 to the diaphragm shut-off motor 42. A tube 53 connects tube 52 to a valve 54, preferably equipped with a strainer. A tube 55 connects valve 54 with a fixed throttling orifice device 56. Another tube 57 connects the orifice device with diaphragm control valve 43. A tube 58 in turn connects the orifice device with a control nozzle or pilot valve 59 within the recorder and controller instrument 40.

A flapper 60, which swings on a pivot 61 connected with a linkage 62 to the differential pen shaft 47, is associated with the control nozzle 59. The flapper is adapted to be swung away from the control nozzle so as to permit the required air leakage necessary to establish the correct rate of flow.

A program clock or time cycle controller 63, provided with a fixed cam 64, connects the 3-way solenoid operated valve 50 by means of leads 65 and 66.

The apparatus shown may be operated as follows: Referring to Fig. 1, fluid 67 (chlorine gas, for example) flowing through the pipe 31 fills tubes 36 and 37 and the two upper diaphragm chambers 21 and 24. If the pressure of the fluid is the same on diaphragms 22 and 25, the heavy gravity liquid 39 tends to level itself to give the sam meniscus reading in each arm of the manometer. In practice, however, there will be a difference in the meniscus levels, which difference may be noted from the orifice meter scale 14. The meniscus in the up-stream arm 11 of the manometer will usually be lower than that in the down-stream arm 12, because the pressure of the fluid to be measured on the up-stream diaphragm 22 is greater than the pressure of the fluid on the down-stream diaphragm 25. The pressure impulses of the fluid are transmitted, first, through the diaphragms, second, to and through the lighter gravity liquid 38 which hydraulically supports the diaphragms, and third, to the heavier gravity liquid 39. If the fluid 67 flows through the pipe 31 at a constant rate (volume), the orifice meter scale 14 will indicate a certain differential. A change in differential on the scale then indicates a change in the rate of flow of the fluid. Thus, if the rate of flow of the fluid increases, the pressure of the fluid in the up-stream chamber 21 on diaphragm 22 increases and the differential increases. As the differential increases, the meniscus of the heavy gravity liquid 39 in the up-stream manometer arm 11 falls, and the meniscus in the down-stream manometer arm 12 rises. Pressure of the fluid in the down-stream chamber 24 on diaphragm 25 is correspondingly lessened. The difference between the pressure on the up-stream side and the pressure on the down-stream side of the restricted orifice 33 is at once readable from the scale 14, as an increase in differential.

If, on the other hand, the rate of flow of the fluid 67 through the pipe 31 decreases, the pressure of the fluid in the up-stream chamber 21 on diaphragm 22 is lessened, and the differential decreases. As the differential decreases, the meniscus of the heavy gravity liquid 39 in the up-stream arm 11 rises, and the meniscus in the down-stream arm 12 falls. Pressure of the fluid in the down-stream chamber 24 on diaphragm 25 is correspondingly increased. The difference between the pressure on the up-stream side and the pressure on the down-stream side of the restricted orifice 33 is indicated on scale 14 as a decrease in differential.

The thin diaphragms 22 and 25 must always be supported upon or hydraulically cushioned by the lighter gravity liquid 38; and is assembled with all air or gas excluded from the device, because air or gas, being an elastic body, would provide inaccurate reading. Each diaphragm is therefore quickly and readily responsive to a change in fluid pressure on the other diaphragm. An increase or decrease of fluid pressure on one diaphragm causes a substantially instantaneous increase or decrease, respectively, of fluid pressure on the other diaphragm. The fluid, however, does not and cannot contact the manometer liquid. In this manner, it may be determined whether or not the flow of fluid takes place at a predetermined maximum rate, as in the case of differential manometers heretofore employed in which the fluid does come in contact with the manometer liquid.

With regard to the apparatus shown in Fig. 3, the manometer and secondary device are similarly employed. An automatic recorder, however, is substituted for the scale 14, and a controller is employed automatically to regulate the flow of fluid 67 through pipe 31, up-stream branch 31—*u* and down-stream branch 31—*d*, so as to cause it to flow at a predetermined maximum rate. Operation of this apparatus is started by depressing a push button on the time cycle controller 63, which energizes the solenoid located in the 3-way solenoid operated valve 50. This valve opens so as to admit air pressure to the discharge of the valve. The high pressure side of the air discharge is carried to the diaphragm of stop motor 42, and the motor is set in operation. The motor in turn opens stop valve 41.

Chlorine gas is then admitted through pipe 31, valve 41, up-stream approach pipe 31—*u*, orifice 33, down-stream discharge pipe 31—*d* and control valve 43.

When air is admitted through pressure reducing valve 54 and throttling orifice 56 to tubes 57 and 58, control nozzle 59 is in a closed position due to the fact that differential pen shaft 47 is located at zero position. Air pressure is therefore directed through tube 57 to the diaphragm of control valve 43 until such time as the correct rate of chlorine flow through pipe 31 is established and the differential across the thin plate restricted orifice 33 is such that the differential pen shaft 47 is carried to its established operating position. When this occurs, flapper 60 is pivotally swung away from nozzle 59 so as to permit the required air leakage necessary to establish the correct rate of flow. When the time interval is passed which has been established as necessary to deliver the quantity of chlorine required, fixed cam 64 in the time cycle controller 63 opens the electrical circuit to the 3-way solenoid operated valve 50 and the air control pressure is discharged through air vent 51.

I claim:

1. In a fluid flow measuring device, a differential manometer having two communicating arms, a pair of housings, a self-sustaining diaphragm of thin flat metal which is resistant to the action of chlorine extending transversely across each of said housings and dividing each of them into two non-communicating chambers, one manometer arm communicating with one chamber in one housing and the other manometer arm communicating with one chamber in the other housing, a differential pressure-creating means, the other chambers of said housings communicating respectively with opposite sides of said differential pressure-creating means, two immiscible liquids of different densities completely filling the manometer and the chambers communicating therewith, whereby any change of pressure on either side of the differential pressure-creating means will cause pressure to be transmitted directly and positively through the diaphragm in one chamber and said liquids to the diaphragm in the other chamber, said liquids having characteristics such that the line of demarcation between one liquid and the other is readily discernible.

2. In a fluid-flow measuring device, a differential manometer having two communicating arms, a pair of housings, a self-sustaining diaphragm of thin flat metal which is resistant to the action of chlorine extending transversely across each of said housings and dividing each of them into two non-communicating chambers, one manometer arm communicating with one chamber in one housing and the other manometer arm communicating with one chamber in the other housing, a differential pressure-creating means, the other chambers of said housings communicating respectively with opposite sides of said differential pressure-creating means, two immiscible liquids of different densities completely filling the manometer and its communicating chambers, whereby any change of pressure on either side of the differential pressure-creating means will cause pressure to be transmitted directly and positively through the diaphragm in one chamber and said liquids to the diaphragm in the other chamber, a float supported by the denser liquid and submerged in the liquid of lesser density, and means actuated by said float for indicating differences in manometer level.

GREGORY A. PETROE.